(12) United States Patent
Jalkler

(10) Patent No.: US 10,920,840 B2
(45) Date of Patent: Feb. 16, 2021

(54) ROTOR ASSEMBLY FOR A DISC BRAKE SYSTEM

(71) Applicant: Volvo Car Corporation, Gothenburg (SE)

(72) Inventor: Quintus Jalkler, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 72 days.

(21) Appl. No.: 16/288,260

(22) Filed: Feb. 28, 2019

(65) Prior Publication Data

US 2020/0278004 A1  Sep. 3, 2020

(51) Int. Cl.
*F16D 65/02* (2006.01)
*F16D 65/12* (2006.01)

(52) U.S. Cl.
CPC ...... *F16D 65/127* (2013.01); *F16D 2065/132* (2013.01); *F16D 2065/1312* (2013.01); *F16D 2065/1328* (2013.01)

(58) Field of Classification Search
CPC .............. F16D 65/127; F16D 65/123; F16D 2065/1356; F16D 2065/132; F16D 2065/1328

See application file for complete search history.

(56) References Cited

U.S. PATENT DOCUMENTS

| 1,879,744 A | 9/1932 | Heiney |
| 6,032,769 A | 3/2000 | Daudi |
| 6,287,500 B1 | 9/2001 | Militello et al. |
| 2002/0084156 A1 | 7/2002 | Ballinger et al. |
| 2005/0183909 A1 | 8/2005 | Rau, II et al. |
| 2005/0269172 A1 | 12/2005 | Thorpe |
| 2007/0181390 A1* | 8/2007 | Korm ................ F16D 65/128 188/218 XL |
| 2009/0272610 A1* | 11/2009 | Moessinger ........ F16D 65/125 188/264 AA |

(Continued)

FOREIGN PATENT DOCUMENTS

| DE | 4237372 A1 | 5/1993 |
| FR | 2977288 A1 | 1/2013 |

OTHER PUBLICATIONS

Jul. 1, 2020 European Search Report issued on International Application No. 20156615.

*Primary Examiner* — Thomas J Williams
*Assistant Examiner* — James K Hsiao
(74) *Attorney, Agent, or Firm* — Clements Bernard Walker; Christopher L. Bernard

(57) ABSTRACT

A rotor assembly for a disc brake system is provided with a central mounting section having a hub, a flange connected to a radially outer edge of the hub, and a first set of connection elements formed in or on the flange. The rotor assembly also includes an outer friction ring section including a radially inner flange and a second set of connection elements formed in or on the radially inner flange. The hub of the central mounting section is configured for connection to a wheel/axle of a vehicle. The outer friction ring section includes surfaces configured for contact with one or more brake pads of a caliper. Also, the first and second sets of connection elements are configured to be press fit together to connect the central mounting section with the outer friction ring section. The outer friction ring section may be implemented as attachable ring members.

21 Claims, 8 Drawing Sheets

(56) References Cited

U.S. PATENT DOCUMENTS

| | | | |
|---|---|---|---|
| 2013/0087420 A1* | 4/2013 | Fraley | F16D 65/128 |
| | | | 188/218 XL |
| 2013/0112514 A1* | 5/2013 | Hanna | F16D 65/0006 |
| | | | 188/218 XL |
| 2014/0339027 A1* | 11/2014 | Wurth | F16D 65/125 |
| | | | 188/218 XL |
| 2017/0037917 A1* | 2/2017 | Zhou | B22D 19/16 |
| 2017/0074335 A1 | 3/2017 | Wagner | |
| 2017/0184164 A1* | 6/2017 | Bean | F16D 69/023 |
| 2018/0163802 A1* | 6/2018 | Boffelli | F16D 65/128 |
| 2019/0003540 A1 | 1/2019 | Paul | |

\* cited by examiner

ROTOR ASSEMBLY FOR A DISC BRAKE SYSTEM

TECHNICAL FIELD

The present invention relates generally to the automotive field. More specifically, the present invention relates to disc brake systems and rotor assemblies that are used in disc brake systems.

BACKGROUND

In general, disc brake systems are commonly installed on various types of vehicles for slowing and stopping the vehicles. A typical disc brake system includes a rotor, which is attached to a wheel or axle of the vehicle and rotates with the wheel or axle. A caliper assembly, which remains relatively fixed to the vehicle, straddles the rotor. The caliper assembly usually includes a pair of brake pads, but in some systems may include fewer or more brake pads. The brake pads, when actuated, apply a force on friction surfaces of the rotor. When the vehicle is in motion and the rotor is rotating with the wheel of the vehicle, the frictional force supplied by the brake pads on the rotor will slow down and eventually stop the vehicle.

Additionally, it should be understood that different vehicles may of course be designed to have various sizes and styles of wheels and hence various sizes and configurations of braking systems. In the manufacturing process, an automobile manufacturer may build various machining tools that are capable of creating the various sizes and configurations of braking systems needed for the different vehicles. For example, the rotor of a disc brake system may have various sizes and styles, and incorporate different materials, based on the particular vehicle being manufactured.

Normally, rotors for different types of vehicles will be cast as one unitary piece from a single material. With numerous sizes and styles, a corresponding number of machining tools may be needed to produce the various rotor sizes and styles. Therefore, there is a need in the automotive field to simplify the rotor manufacturing process such that fewer customized machining tools will be needed to create different rotors of different sizes, styles, and materials.

SUMMARY

Accordingly, a rotor assembly for a disc brake system is described in the present disclosure. According to one embodiment, the rotor assembly includes a central mounting section including a hub, a flange connected to a radial outer edge of the hub, and a first set of connection elements formed in or on the flange. The rotor assembly also includes an outer friction ring section including a radial inner flange and a second set of connection elements formed in or on the radial inner flange. The hub of the central mounting section is configured for connection to a wheel or axle of a vehicle. The outer friction ring section includes friction surfaces configured for contact with one or more brake pads of a disc brake caliper. Also, the first set of connection elements of the central mounting section and the second set of connection elements of the outer friction ring section are configured to be press fit together to connect the central mounting section with the outer friction ring section.

The present disclosure further describes a disc brake system of a vehicle. For example, the disc brake system may comprise a caliper assembly having a pair of brake pads and a rotor assembly having friction surfaces configured for engagement with the brake pads of the caliper assembly. The rotor assembly includes a central mounting section including a hub, a flange connected to a radial outer edge of the hub, and a plurality of openings formed in the flange. The rotor assembly also includes a first ring member having a radial inner flange and a plurality of protruding inserts formed on the radially inner flange and a second ring member arranged substantially parallel with the first ring member. The second ring member includes a radial inner flange and a plurality of protruding inserts formed on the radially inner flange. The hub of the central mounting section is configured for connection to a wheel or axle of the vehicle. Also, the protruding inserts of the first and second ring members are configured to be press fit with openings of the central mounting section to connect the central mounting section with the first and second ring members.

BRIEF DESCRIPTION OF THE DRAWINGS

The present invention is illustrated and described herein with reference to the various drawings, in which like reference numbers are used to denote like system or assembly components/methods or algorithm steps. The illustrated components are not necessarily drawn to scale.

DESCRIPTION OF EMBODIMENTS

In the field of automotive manufacturing, various sizes and styles of rotors are needed for different vehicles. Rotors are typically constructed as a single, unitary piece, from a single material. The present disclosure provides rotor assemblies constructed by creating multiple modular pieces and fitting the pieces together. In this way, the present disclosure provides greater flexibility in the design of rotors. Different size rotors can be constructed, with different styles, and utilizing different materials.

By way of example, suppose that an automobile manufacturer has twelve different varieties of rotors for different vehicles, where a central mounting part of the rotor may have three different designs and an outer ring part of the rotor may have four different designs, for instance. In this situation, the automotive manufacturer may need to create twelve different machining tools to produce the twelve different rotors. However, the present disclosure simplifies this process using an assembly of rotor parts variously connectable to form rotors. As such, the present disclosure simplifies the manufacturing process by allowing the manufacturer to create fewer machining tools, for example, three for the various central mounting parts and four for the various outer ring parts for a total of only seven, instead of twelve, in this example. The parts may include connection elements that allow the parts to be connected together to form the integrated rotor assembly.

Figure 1:
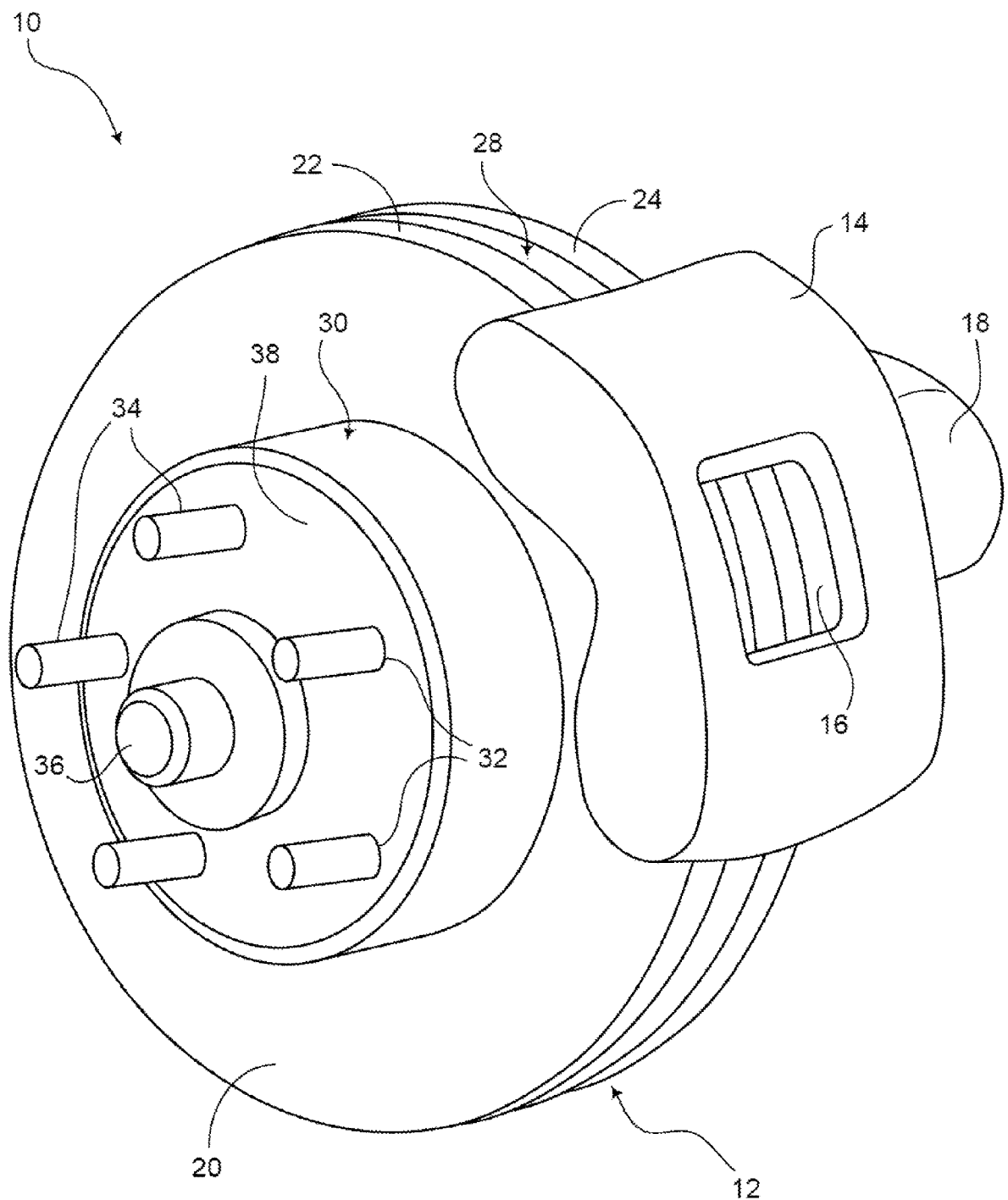
FIG. 1 is a diagram illustrating a perspective view of a disc brake system including a rotor assembly according to various embodiments of the present invention.

FIG. 1 is a perspective view showing an embodiment of a disc brake system 10. The disc brake system 10 as shown in FIG. 1 may include several components that are typically included in conventional disc brake systems, except that the disc brake system 10 described in the present disclosure includes a rotor assembly 12 that may be configured, according to various embodiments, to include a modular construction. In other words, the rotor assembly 12 may include multiple parts that can be connected together. For example, the multiple parts may each include various types of connection elements that allow the parts to be connected together to form the rotor assembly 12. More particularly, the pieces can be connected using a press fit process as disclosed herein.

The disc brake system 10 includes a caliper assembly 14 that may be firmly attached to a support structure of the vehicle to keep the caliper assembly 14 in a fixed position relative to the rotor assembly 12. Also, the caliper assembly 14 is configured to straddle the rotor assembly 12. The caliper assembly 14 may include a pair, or any number, of brake pads 16. The disc brake system 10 further includes a piston housing 18. Brake fluid, which is compressed by a master cylinder (not illustrated), forces a piston (not illustrated) in the piston housing 18 to apply a force on the brake pads 16, causing the brake pads 16 into contact with friction surfaces 20 of the rotor assembly 12.

The brake pads 16 are configured, during a braking action, to squeeze the friction surfaces 20, which may be relatively flat surfaces on an outside face of the rotor assembly 12. Friction between the brake pads 16 and friction surfaces 20 cause the rotor assembly 12, which rotates along with the rotation of the respective wheel or axle of the vehicle, to slow down and eventually stop, thereby slowing and stopping the rotation of the wheel/axle and the vehicle.

The rotor assembly 12, according to various embodiments, may include a first ring member 22 and a second ring member 24. The first ring member 22 may be configured to face outward from a wheel well of the vehicle, while the second ring member 24 may be configured to face inward toward the wheel well. The first and second ring members 22, 24 may be connected to each other by a plurality of connection elements (described in greater detail herein below) formed in or on the adjacent inner facing surfaces of the ring members 22, 24. A ventilation space 28 may thus be formed between the ring members 22, 24 by the connection elements.

The rotor assembly 12 further includes a central mounting section 30, which is configured for attaching the rotor assembly 12 to a wheel or axle of the vehicle. The central mounting section 30 may also be referred to as a bell or hat, since it may resemble a bell or hat when placed on its side, and the central mounting section 30 may be attached to the wheel hub or similar rotating structure coupled to the axle of the vehicle.

As shown in FIG. 1, the central mounting section 30 may include openings 32 that correspond to studs 34 of an axle 36. Therefore, the rotor assembly 12 can be fitted on the axle 36 by adjusting the rotor assembly 12 such that the studs 34 may be inserted through the openings 32 in a hub 38 of the central mounting section 30.

Figure 2:
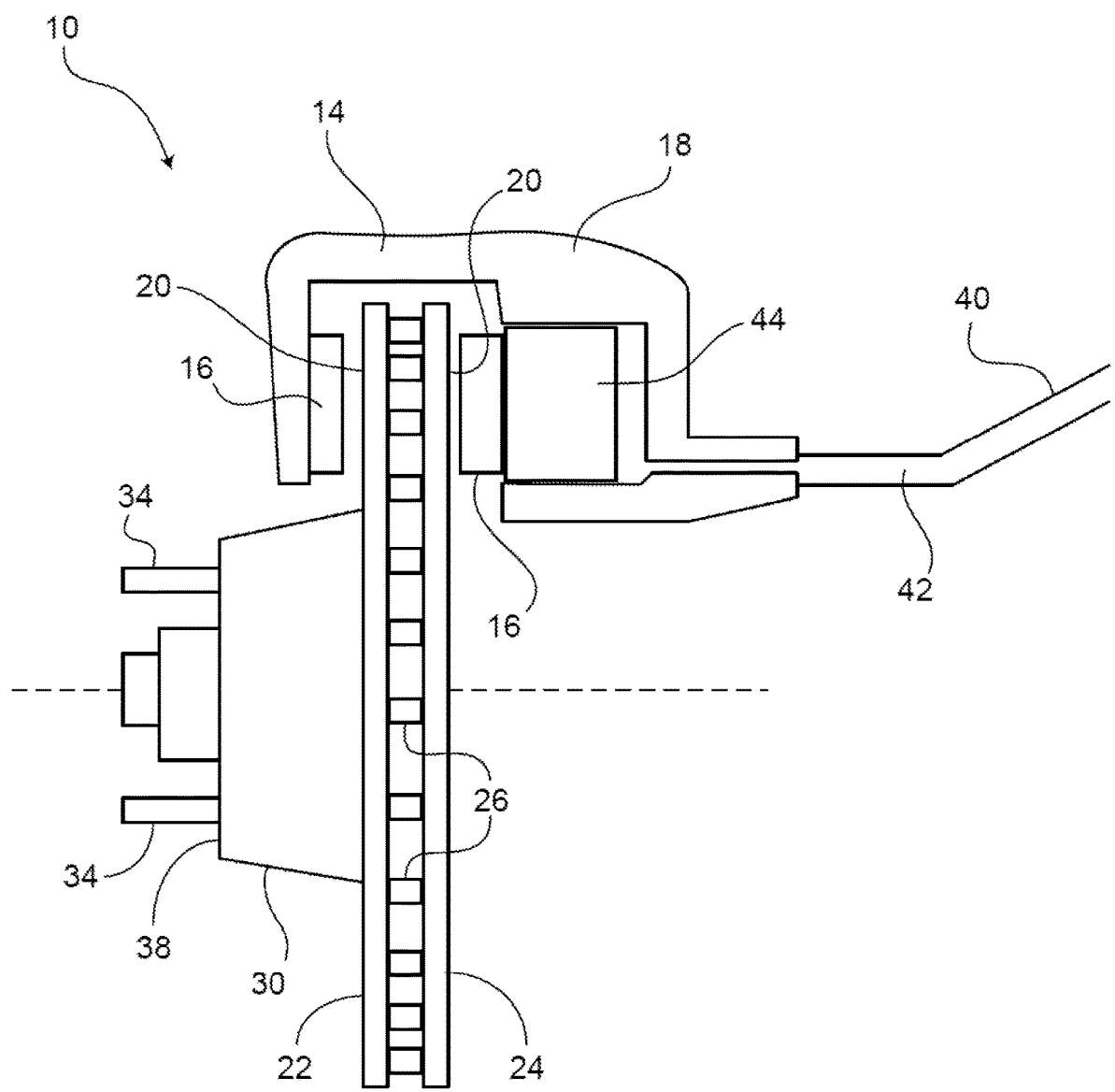
FIG. 2 is a diagram illustrating an edge side view of the disc brake system of FIG. 1.

FIG. 2 is a side view showing an edge of the disc brake system 10. During a braking operation, a brake line 40, which extends to the master cylinder (not illustrated) of the braking system, moves brake fluid 42 into the piston housing 18 to cause one or more pistons 44 to force the brake pads 16 against the friction surfaces 20 of the first and second ring members 22, 24.

Also, as shown in FIG. 2, the hub 38 (i.e., the front portion) of the central mounting section 30, which engages with the studs 34 of the vehicle axle, is oriented in a plane that is substantially perpendicular to the axle of the vehicle and is offset from and substantially parallel with a plane in which the first ring member 22 is configured. In turn, the first ring member 22 is offset from and substantially parallel with a plane in which the second ring member 24 is configured.

Figure 3:
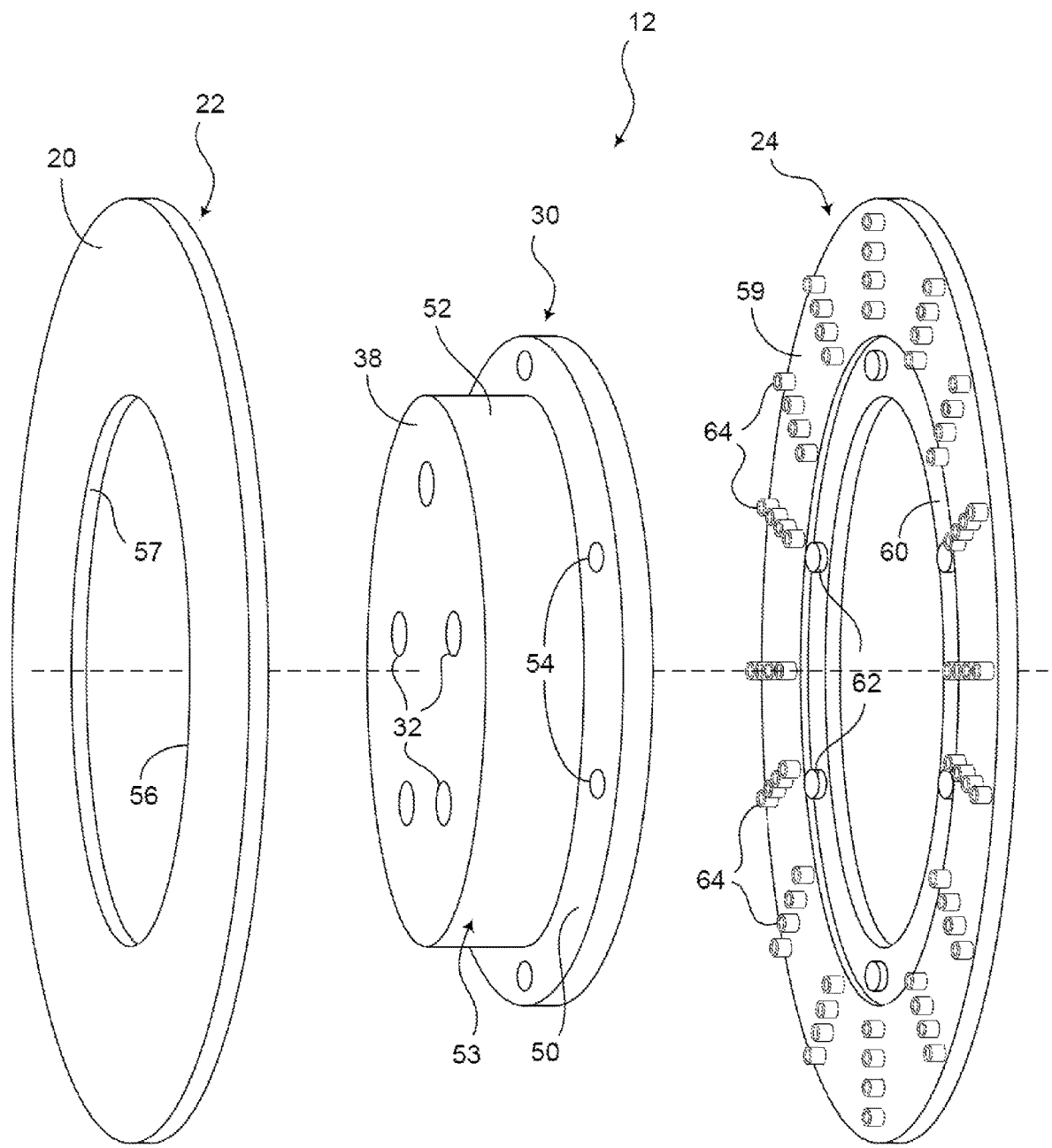
FIG. 3 is a diagram illustrating an exploded view of an outer portion of a rotor assembly according to various embodiments of the present invention.

FIG. 3 is an exploded view showing an embodiment of the rotor assembly 12 from a perspective of the rotor assembly 12, which, when installed on the axle, would appear from outside the vehicle looking in at an angle toward the wheel well. The rotor assembly 12 includes the first ring member 22, the second ring member 24, and the central mounting section 30.

The embodiment shown in FIG. 3 simply represents one configuration of one particular size and design of an outer friction ring section (i.e., the first and second ring members 22, 24) and one particular size and design of the central mounting section 30. The components of the rotor assembly 12, as illustrated, are not necessarily drawn to scale. Also, according to other embodiments, the parts of the rotor assembly 12 may have different sizes and designs, such as different thicknesses, lengths, and widths of various parts. They may also be made of the same or different materials. Thus, by allowing various sizes and materials, the present disclosure supports the connection of one type of a central mounting section 30 with any one of multiple types of ring members 22, 24 and the connection of one type of ring member 22, 24 with any one of multiple types of central mounting sections 30. This flexibility allows an automobile manufacturer to produce a large range of designs for the rotor assembly 12 with fewer machining tools.

It should be noted, however, that with the flexibility to enable the connection of various types of central mounting sections 30 with various types of ring members 22, 24, the present disclosure provides a consistent interface of connection elements between the central mounting section 30 and the first and second ring members 22, 24. In this way, any central mounting section 30 can be connected with any ring members 22, 24 in the same manner.

As shown in FIG. 3, the central mounting section 30 includes the hub 38 at a front end of the central mounting section 30 and the openings 32 in the hub 38 configured for engagement with the studs 34 of the wheel axle (i.e., the wheel hub). The central mounting section 30 also includes a flange 50 and a band 52 that connects the flange 50 to the hub 38. In some embodiments, the band 52 may be cylindrical, but according to other embodiments, the band 52 may have a frustoconical shape or other suitable shape. The flange 50 includes openings or recesses 54, which are described in greater detail herein below.

The first ring member 22 includes an aperture 56 that is configured to receive the band 52 of the central mounting section 30. In some embodiments, the width of the band 52 may be greater than the depth of the aperture 56, such that the hub 38 of the central mounting section 30 may extend out beyond a front surface 20 of the first ring member 22 when the central mounting section 30 is connected with the first ring member 22. According to some embodiments, the band 52 may include an outer wall surface 53 having a diameter that allows the band 52 to be press fit onto the inner walls 57 of the aperture 56.

As mentioned throughout the present disclosure, the term "press fit" or "press fitting" is used to describe a connection process whereby the surfaces on one piece (e.g., the outer surface 53 of the band 52) contacts the surfaces on another piece (e.g., the inner wall 57 of the aperture 56 of the first ring member 22). Contact is made during a connection process in which the pieces are joined together. Also, the contact between the surfaces (e.g., wall 53 and wall 57) after the initial connection may provide a resistance to prevent the pieces from easily coming apart. Thus, the pieces are constructed such that they fit together with such accuracy that the large amount of surface area on one piece contacts a large amount of surface area on the other piece.

Therefore, the two pieces that are press fit together will remain connected during use. Although the pieces could be removed from each other, there may not be any need to do so. Also, with the large amount of resistive force exerted by the contact surfaces, it may require a large amount of force to pull the pieces apart without destroying the connection elements on the pieces. In some respects, the press fitting of two pieces, as described in the present disclosure, may be similar to the connection forces that may be experienced by building block toys having interlocking connection elements.

Returning again to FIG. 3, the second ring member 24 of the rotor assembly 12 includes a surface 59 that faces in an inward direction toward the first ring member 22. The surface 59 includes a step or indentation 60 at a radially inward edge of the second ring member 24. The indentation 60 may include a thickness that is less than the thickness of the rest of the second ring member 24. The indentation 60 may include one or more inserts 62 that extend outward from the base of the indentation 60 in a direction that is substantially parallel to an axis of the rotor assembly 12. When the second ring member 24 and central mounting section 30 are connected together, the inserts 62 are inserted at least partially into and/or through the openings 54 of the flange 50 of the central mounting section 30.

As illustrated, the indentation 60 includes six inserts 62 spaced around the periphery of the indentation 60. In some embodiments, the second ring member 24 may be configured such that the inserts 62 are equally spaced around the indentation 60. However, in other embodiments, the configuration of inserts 62 may include a specific spacing pattern such that the second ring member 24 and central mounting section 30 can only be connected in one specific keyed orientation.

The second ring member 24 further includes a plurality of connection elements formed on the inward directed surface 59. For example, the connection elements may be configured as stub receptacles 64 that are configured to be connected with corresponding connection elements on an inner surface of the first ring member 22, as described in greater detail herein below. The arrangement of stub receptacles 64 may be configured to correspond to the same or similar arrangement of compatible connection elements on the first ring member 22, in any predetermined pattern.

In some embodiments, the stub receptacles 64 are constructed in a single molding, forming, or printing process with the rest of the second ring member 24. Alternatively, the stub receptacles 64 may be applied to the inner surface 59 using adhesive or using other various additive connection techniques.

According to some embodiments in which a ventilation spacing 28 (FIG. 1) between the first and second ring members 22, 24 is minimized or is eliminated completely, the stub receptacles 64 may be configured instead as holes within the surface 59 of the second ring member 24 such that corresponding connection elements of the first ring member 22 can be inserted into the holes. Thus, the height of stub receptacles would be minimal or eliminated completely so as not to interfere with the surface 59 being close to or contacting an inner surface of the first ring member 22.

In some embodiments, the rotor assembly 12 may be constructed with only two pieces. For instance, the first and second ring members 22, 24 may alternatively be manufactured as a single piece, whereby the central mounting section 30 is connectable to the single piece by press fitting the inserts 62 into the openings 54 of the central mounting section 30. In this alternative embodiment, the combined ring member may include inserts that are longer than the inserts 62 described with respect to FIG. 3 in order that when the inserts are inserted in the openings 54, a greater backing-out resistance force will be created to prevent the central mounting section 30 from being disconnected from the ring member piece.

Figure 4:
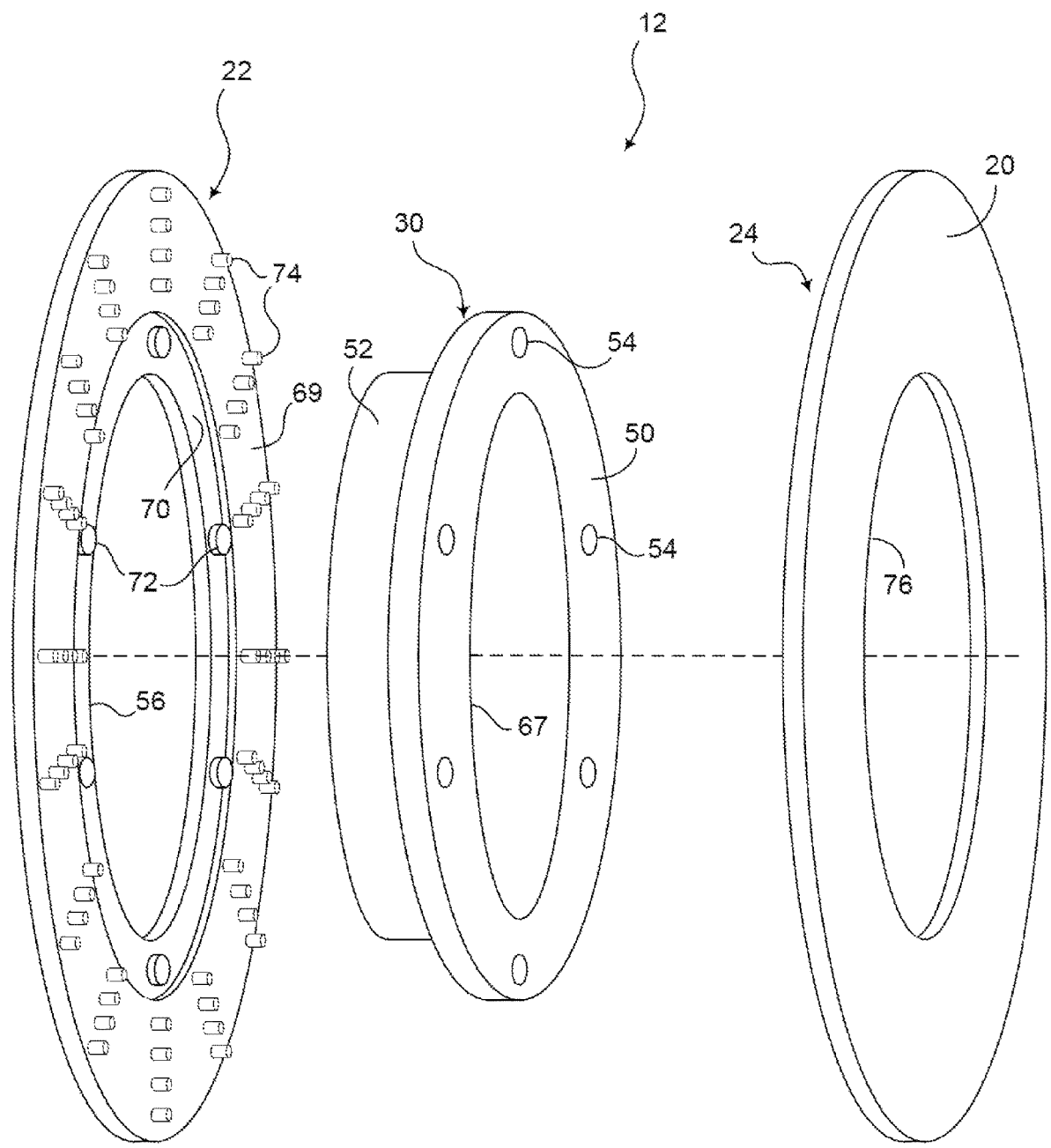
FIG. 4 is a diagram illustrating an exploded view of an inner portion of the rotor assembly of FIG. 3.

FIG. 4 is an exploded view showing an embodiment of the rotor assembly 12 from a perspective of the rotor assembly 12, which, when installed on the axle, would be viewed at an angle from inside the wheel well. As shown in FIG. 4, the central mounting section 30 is configured such that the flange 50 extends out from the band 52 and includes a central aperture 67, which is configured to allow the rotor assembly 12 to fit on a wheel or axle of the vehicle.

As mentioned above with respect to FIG. 3, the connection between the central mounting section 30 and the second ring member 24 is described, whereby the inserts 62 of the second ring member 24 are inserted into the opening 54 of the central mounting section 30. In addition to this connection, the central mounting section 30 and first ring member 22 may be connected together.

For example, the first ring member 22 includes a surface 69 that is configured to face inwardly toward the second ring member 24. A radially inward edge of the first ring member 22 includes a step, recess, or indentation 70. The indentation 70 may include a thickness that is smaller than the thickness of the rest of the first ring member 22. The indentation 70 may be configured to include one or more inserts 72, which may be similar to the inserts 62 on the second ring member 24. Although six inserts 62, 72 are shown in FIGS. 3-4 on each of the first and second ring members 22, 24, the first and second ring members 22, 24 may alternatively be constructed with any number of inserts.

The inserts 72 may be configured to be at least partially inserted into the openings 54 of the central mounting section 30. The inserts 72 may be configured to extend from the indentation 70 in a direction that is substantially parallel with the axis of the rotor assembly 12. The inserts 72 are thereby inserted in a direction into the openings 54 that is a substantially opposite direction in which the inserts 62 of the second ring member 24 are inserted.

The inserts 62 of the second ring member 24 and the inserts 72 of the first ring member 22 may be configured in the same pattern. In this regard, the length of the inserts 62, 72 may be configured to be less than the width of the flange 50 in which the openings 54 are configured. In some embodiments, the openings 54 may extend entirely through the flange 50, but in other embodiments, the openings 54 may extend only partially into the flange 50 from opposite directions. In still other embodiments, the openings 54 on one side of the flange 50 may be partial openings and may be arranged in different patterns from the opening 54 on the other side. The central mounting section 30 may be configured with more openings than one or both of the number of inserts 62, 72 of the ring members 22, 24.

As mentioned above, the inserts 62 are press fit into the openings 54 from a back side of the flange 50. In addition, the inserts 72 of the first ring member 22 may be press fit into the openings 54 from a front side of the flange 50. Accordingly, the first and second ring members 22, 24 may be configured to sandwich the flange 50 of the central mounting section 30 and provide a connection between the connection elements (i.e., inserts 62, 72 and opening 54) that allows the press fitting process to keep the parts of the rotor assembly 12 together during normal use. When assembled, the outer peripheral surfaces of the inserts 62, 72 remain in contact with the inner peripheral surfaces of the openings 54.

In addition to the connection elements for connecting each of the ring members 22, 24 with the central mounting section 30, the rotor assembly 12 described in the present disclosure further includes connection elements between the first ring member 22 and the second ring member 24. Thus, the connection elements of the first and second ring members 22, 24 provide further points of connection for adequately connecting the rotor assembly 12 together.

Particularly, the inward-directed surface 69 of the first ring member 22 includes connection elements configured in the illustrated embodiment as a plurality of projections 74. The projections 74 extend out from the inner surface 69 in a direction that is substantially parallel to the axis of the rotor assembly 12. Also, the projections 74 are aligned with and correspond to the stub receptacles 64 of the second ring member 24 shown in FIG. 3.

To connect the first and second ring members 22, 24 together, the projections 74 are inserted into a cavity of the stub receptacles 64. Specifically, the outer peripheral surface of the projections 74 are configured to have substantially the same dimensions as the inside peripheral surfaces of the stub receptacles 64. Thus, when the first and second ring members 22, 24 are press fit together, the outer surfaces of the projections 74 slide against and remain in contact with the inner surfaces of the stub receptacles 64. With such a great amount of surface area of the multiple projections 74 making contact with such as great amount of surface area of the stub receptacles 64, the first and second ring members 22, 24 remain connected and are not easily removed from each other without a significant amount of force. Also, with the connection of the ring members 22, 24, the central mounting section 30 is more securely held in place between the two ring members 22, 24. Thus, once the ring members 22, 24 are aligned and connected, the pieces of the rotor assembly 12 can remain securely assembled during use in the disc brake system 10.

Figure 5:
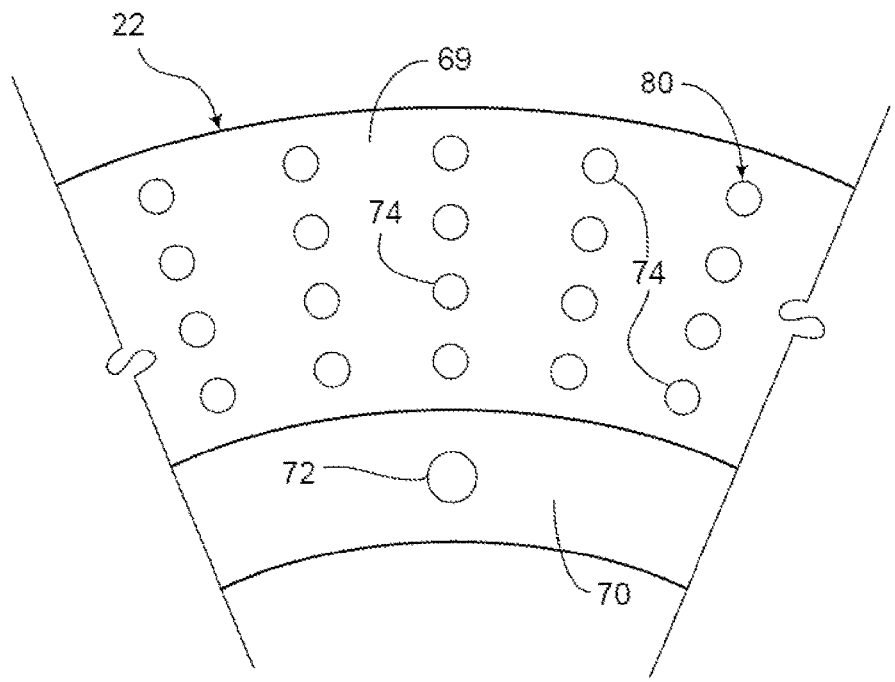
FIG. 5 is a diagram illustrating a partial back side view of a first ring member of the rotor assembly of FIG. 3, according to one embodiment.

FIG. 5 is a diagram showing a view of the details of a portion of the inward surface 69 from a back-side perspective of the first ring member 22. As shown in FIG. 5 according to one embodiment, the surface 69 of the first ring member 22 includes the projections 74, which extend out from the surface 69. In this embodiment, the projections 74 include a circular cross-section having a circular outer wall 80.

Figure 6:
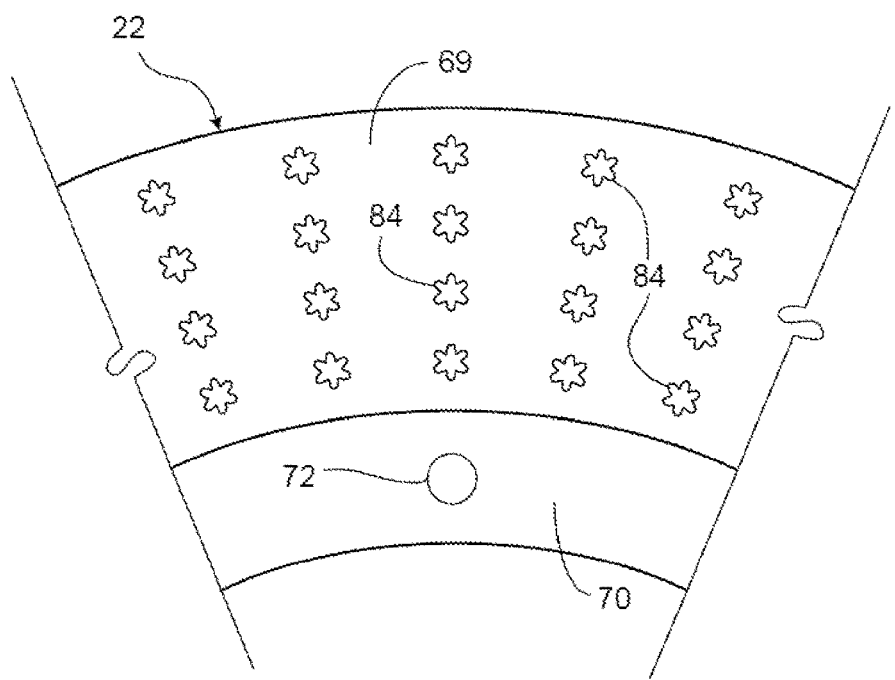
FIG. 6 is a diagram illustrating a partial back side view of the first ring member of the rotor assembly of FIG. 3, according to another embodiment.

FIG. 6 is a diagram showing a view of the details of a portion of the inward surface 69 from a back-side perspective of the first ring member 22. As shown in this embodiment, the surface 69 of the first ring member 22 includes projections 84 that extend out from the surface 69. The projections 84 include an alternative to the circular cross-sectional shape of the projections 74 shown in FIGS. 4 and 5. In this embodiment, the projections 84 may include a star-shaped cross-section with an outer surface shaped like a star or other shape. According to other embodiments, the projections 74, 84 may be configured to include star patterns having any number of points, a triangular shape, a square shape, or any other suitable shape.

Figure 7:
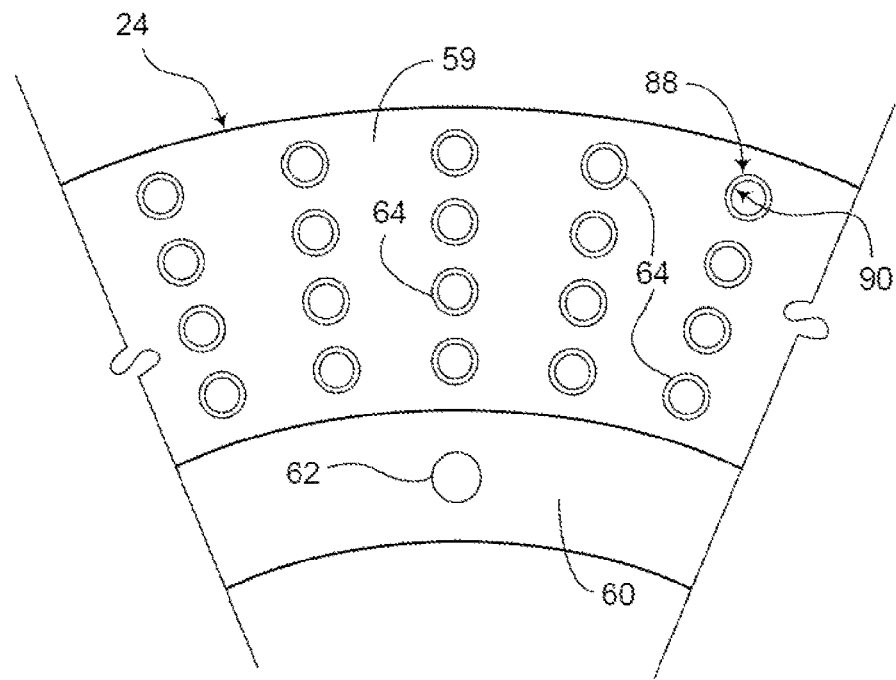
FIG. 7 is a diagram illustrating a partial front side view of a second ring member of the rotor assembly of FIG. 3, according to one embodiment.

FIG. 7 is a diagram illustrating a view of the details of a portion of the inward surface 59 from a front-side perspective of the second ring member 24. As shown in FIG. 7 according to one embodiment, the surface 59 of the second ring member 24 includes the stub receptacles 64, which may extend out from the surface 59 or may be at least partially embedded in the surface 59 of the second ring member 24. In this embodiment, each of the stub receptacles 64 may include an outer wall 88 and an inner wall 90.

As mentioned above, the projections 74 of the first ring member 22 are configured, during the press fit connection process, to be inserted into the interior of the stub receptacles 64. In this respect, the outer surface 80 of the projections 74 (FIG. 5) are configured to rub or slide against the inner wall 90 of the stub receptacles 64 to provide a tight connection. The first and second ring members 22, 24 may include the same or similar patterns of projections 74 and stub receptacles 64 such that a connection process involves aligning the first and second ring member 22, 24 in such a way that the outer walls 80 of the projections 74 are aligned with the inner walls 90 of the stub receptacles 64.

Figure 8:
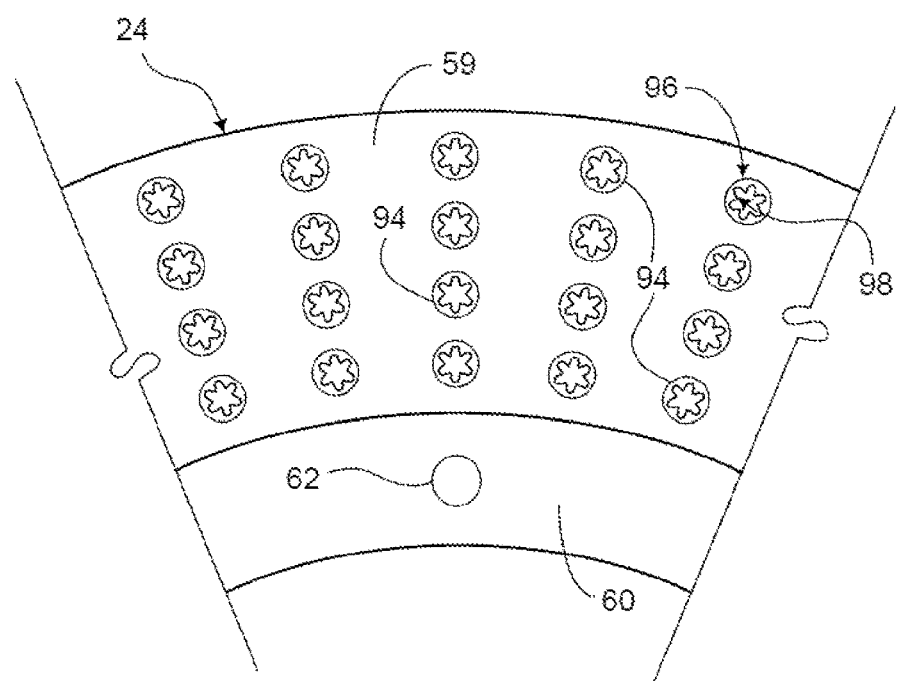
FIG. 8 is a diagram illustrating a partial front side view of the second ring member of the rotor assembly of FIG. 3, according to another embodiment.

FIG. 8 is a diagram illustrating a view of the details of a portion of the inward surface 59 from a front-side perspective of the second ring member 24. As shown in FIG. 8 according one alternative embodiment, the surface 59 of the second ring member 24 includes stub receptacles 94, which may extend out from the surface 59 or may be at least partially embedded in the surface 59 of the second ring member 24. In this alternative embodiment, each of the stub receptacles 94 may include an outer wall 96 and an inner wall 98. The inner wall 98 includes a star-shaped design configured to correspond to the star-shaped configuration (or other shape) of the projections 84 shown in FIG. 6.

The projections 84 (FIG. 6) of the first ring member 22 are configured, during the press fit connection process, to be inserted into the interior of the stub receptacles 94. In this respect, the outer surface of the projections 84 are configured to rub or slide against the inner wall 98 of the stub receptacles 94 to provide a tight connection. The first and second ring members 22, 24 may include the same or similar patterns of projections 84 and stub receptacles 94 on their respective surfaces 69, 59 such that a connection process involves aligning the first and second ring member 22, 24 in such a way that the outer walls of the projections 84 are aligned with the inner walls 98 of the stub receptacles 94.

Figure 9:
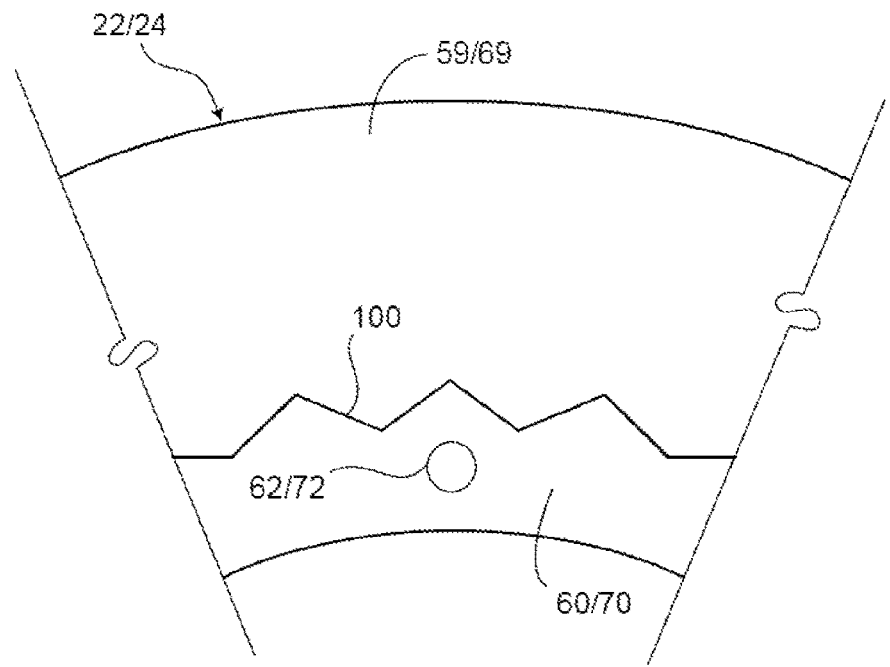
FIG. 9 is a diagram illustrating a partial front side view of the first or second ring member of the rotor assembly of FIG. 3, according to one embodiment.
Figure 10:
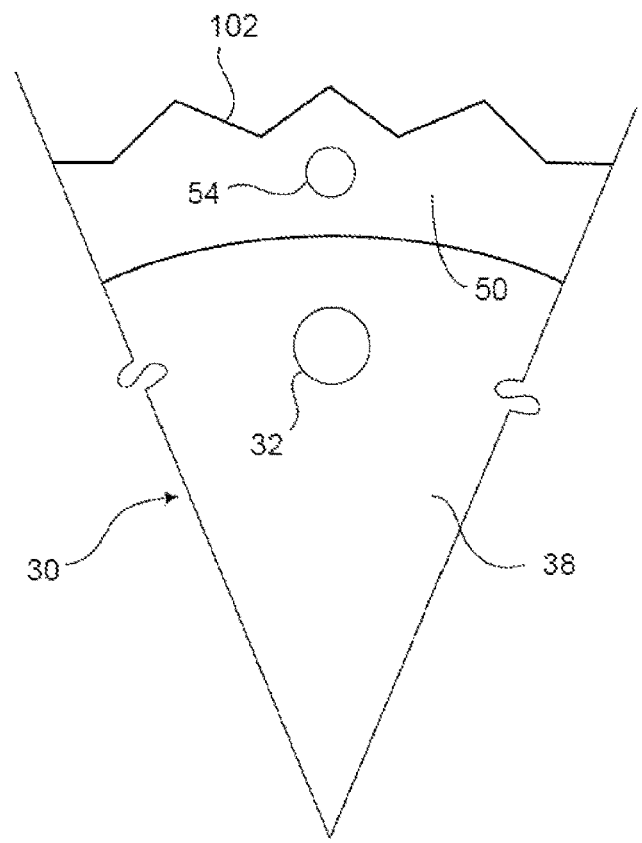
FIG. 10 is a diagram illustrating a partial front side view of a central mounting section of the rotor assembly of FIG. 3, according to one embodiment.

FIGS. 9 and 10 illustrate an embodiment of the first and second ring members 22, 24 and the central mounting section 30 of the rotor assembly 10. As illustrated in other embodiments, the indentations 60, 70 of the ring members 22, 24 may have an radially outward edge that drops below the surface 59, 69, whereby the radially outward indentation edge essentially has a circular cross-section. However, as shown in the embodiment of FIG. 9, the first and/or second indentations 60, 70 of the ring members 22, 24 are formed with a non-circular edge. For example, the edge 100 may be jagged (as shown), wavy, jigsaw-shaped, or have any other suitable non-circular pattern. The edge 100 may have a repeating pattern around the periphery of the indentation 60, 70 or alternatively may have a non-repeating pattern such that the ring members 22, 24 can only be attached to the central mounting section 30 in one orientation.

FIG. 10 illustrates the central mounting section 30 in which the flange 50 includes a non-circular outer edge 102. The outer edge 102 is configured to include the same pattern as the edge 100 of the ring members 22, 24. The edge 102 may be jagged (as shown), wavy, jigsaw-shaped, or having any other suitable non-circular pattern that corresponds with the edge 100 to allow the central mounting section 30 to fit with the first and second ring members 22, 24. For example, the central mounting section 30 may fit with the ring members 22, 24 in a press fit manner, where the non-circular edges 100, 102 provide a larger surface area for enhancing the press fit connection. Also, the non-circular edge connection can help to provide additional back-out resistance to supplement the press fit connection between the inserts 62, 72 and the recesses 54.

Figure 11:
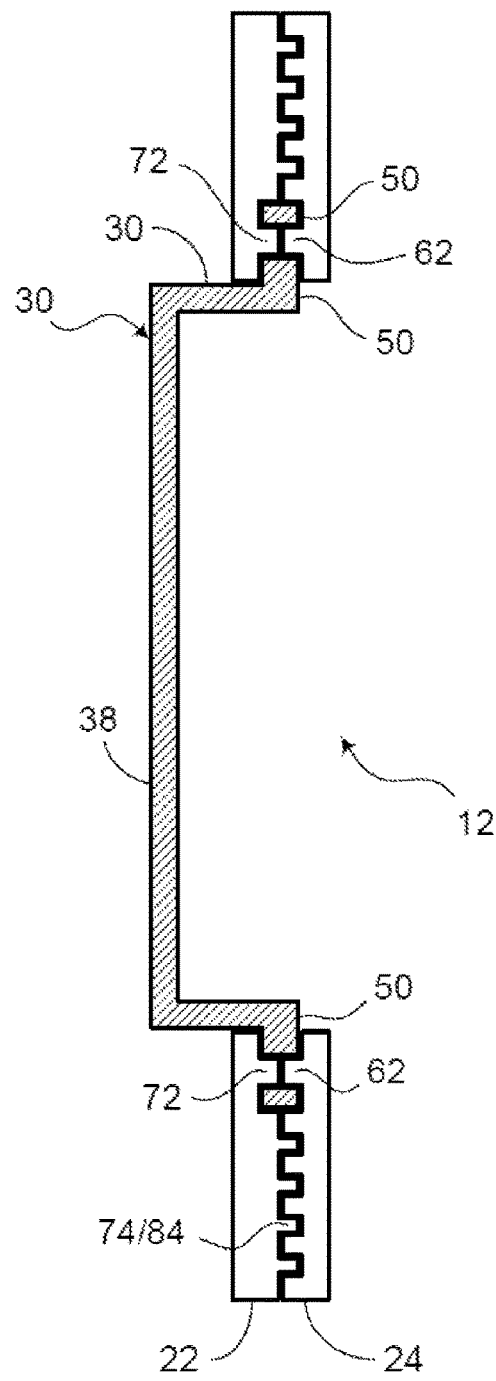
FIG. 11 is a diagram illustrating a cross-sectional edge side view of the rotor assembly of FIG. 3, according to various embodiments of the present invention.

FIG. 11 is a diagram illustrating a cross-section of the rotor assembly 10 according to one embodiment after the rotor assembly 10 has been assembled. In this embodiment, the first and second ring members 22, 24 are configured to be connected together such there is little or no space between the two ring members. As such, the ventilation space 28 is essentially eliminated and the inwardly directed surfaces 59, 69 of the ring members 22, 24 may contact each other.

According to the embodiment of FIG. 11, the stub receptacles 64, 94 (FIGS. 7-8) of the second ring member 24 may be replaced with gaps that extend into the surface 59 of the second ring member 24. The projections 74, 84 can therefore extend into the gaps for the purpose of press fitting the ring members 22, 24 together.

Also, the connection between each of the ring member 22, 24 and the central mounting section 30 is illustrated in FIG. 11. For example, the inserts 62, 72 of the ring members 24, 22 are shown as being inserted partially into the openings 54 of the central mounting section 30 from opposite directions. The height of each of the inserts 62, 72 is shown in FIG. 11 being less than or equal to about half the thickness of the flange 50 of the central mounting section 30. As such, the inserts 62, 72, as illustrated in FIG. 11, may contact each other end to end when each has a height equal to about half the width of the flange 50. Otherwise, if the inserts 62, 72 are less than half the width of the flange 50, in some embodiments, the ends of the inserts 62, 72 do not contact each other.

Figure 12:
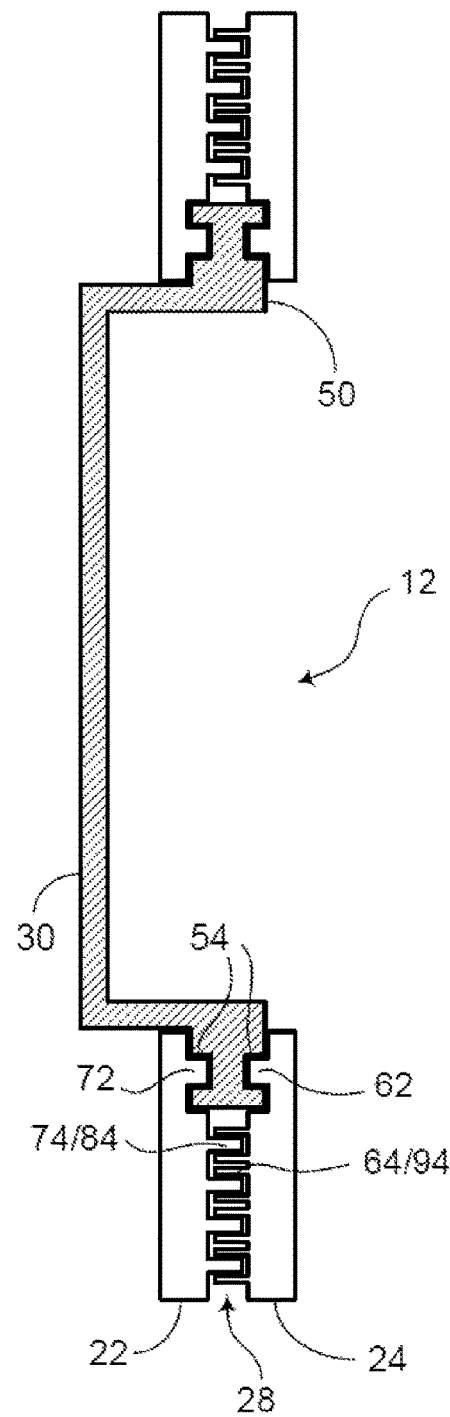
FIG. 12 is a diagram illustrating a cross-sectional edge side view of the rotor assembly of FIG. 3, according to various embodiments of the present invention.

FIG. 12 is a diagram illustrating a cross-section of the assembled rotor assembly 10 according to another embodiment. In this embodiment, the first and second ring members 22, 24 are configured to be connected together such that there is a gap therebetween, forming the ventilation space 28. According to the embodiment of FIG. 12, the stub receptacles 64, 94 of the second ring member 24 extend from the surface 59 of the second ring member 24 to define a space between the ring members 22, 24 to thereby create the ventilation space 28. The projections 74, 84 of the first ring member 22 extend into the stub receptacles 64, 94 for the purpose of press fitting the ring members 22, 24 together.

The connection between each of the ring member 22, 24 and the central mounting section 30 is also illustrated in FIG. 12. With a greater distance between the facing surfaces 59, 69 of the ring members 24, 22, the width of the flange 50 may therefore be greater than in the embodiment of FIG. 11. Also, the openings 54 in the flange 50 may either extend all the way through the flange 50 or may extend only partially into the side surfaces of the flange 50 from opposite directions. In some embodiments, some openings 54 may extend partially through the flange 50 on one side of the flange 50 at some locations and other openings may extend partially through the flange 50 on the other side of the flange 50 at other locations. The two groups of locations may be locations that are opposite from each other, different arrangements from each other, or a combination of some being opposite and some having different arrangements. In FIG. 12, the inserts 62, 72 of the ring members 24, 22 are shown as being inserted partially into the openings 54 of the central mounting section 30 from opposite directions.

Therefore, according to the above description, the present disclosure provides a rotor assembly (e.g., the rotor assembly 12) of a disc brake system (e.g., the disc brake system 10). The rotor assembly 12, according to one embodiment, may comprise a central mounting section (e.g., the central mounting section 30), wherein the central mounting section 30 includes a hub (e.g., hub 38), a flange (e.g., flange 50) connected to a radially outer edge of the hub 38, and a first set of connection elements (e.g., openings 54) formed in or on the flange. The rotor assembly 12 also comprises an outer friction ring section (e.g., the first and second ring members 22, 24) including a radially inner flange (e.g., the indentations 60, 70) and a second set of connection elements (e.g., inserts 62, 72) formed in or on the radially inner flange. The hub 38 of the central mounting section 30 is configured for connection to a wheel or axle of a vehicle. The outer friction ring section includes friction surfaces (e.g., surfaces 20) configured for contact with one or more brake pads (e.g., brake pads 16) of a disc brake caliper (e.g., caliper 14). Also, the first set of connection elements of the central mounting section 30 and the second set of connection elements of the outer friction ring section are configured to be press fit together to connect the central mounting section with the outer friction ring section.

According to some embodiments, the rotor assembly described above may be configured such that the outer friction ring section includes a first ring member (e.g., the first ring member 22) and a second ring member (e.g., the second ring member 24). The first ring member 22 may be arranged substantially parallel with the second ring member 24. The first set of connection elements of the central mounting section 30 may include one or more opening 54, and the second set of connection elements of the outer friction ring section may include one or more protruding inserts 72, 62 on each of the first and second ring members 22, 24.

For connecting the outer friction ring section 22, 24 with the central mounting section 30, each of the one or more protruding inserts 72 on the first ring member is press fit into a respective opening 54 of the central mounting section 30 from a first direction and each of the one or more protruding inserts 62 on the second ring member 24 is press fit into the respective opening 54 of the central mounting section 30 from a second direction that is opposite of the first direction.

Each of the first and second ring members 22, 24 may include between 3 and 12 protruding inserts and the central mounting section 30 may correspondingly include between 3 and 12 openings.

The rotor assembly 12 described above may further be configured such that the first and second ring members 22, 24 include a third set of connection elements (e.g., projections 74, 84) and a fourth set of connection elements (e.g., stub receptacles 64, 94). The third and fourth sets of connection elements may be configured to be press fit together to connect the first ring member 22 with the second ring member 24. The third set of connection elements includes a plurality of projections 74, 84 and the fourth set of connection elements includes a plurality of stub receptacles 64, 94, wherein the projections 74, 84 are press fit into the stub receptacles 64, 94 to connect the first ring member 22 with the second ring member 24.

The projections 74, 84 extend from an axially inward surface (e.g., surface 69) of the first ring member 22 facing the second ring member 24 and the stub receptacles 64, 94 extend from an axially inward surface (e.g., surface 59) of the second ring member 24 facing the first ring member 22. The length of the projections 74, 84 and stub receptacles 64, 94 may define a separation distance between the axially inward surfaces of the first and second ring members to create a ventilation space (e.g., ventilation space 28) between the first and second ring members 22, 24. The central mounting section 30 may be press fit with the second ring member 24 in a first connection operation and the central mounting section 30 and the second ring member 24 may then be press fit with the first ring member 22 in a second connection operation.

The rotor assembly 12 may be constructed of various materials. For example, the materials used for manufacturing the outer friction ring section (e.g., the first and second ring members 22, 24) may be different from materials used for manufacturing the central mounting section 30. The outer friction ring section 22, 24 may comprise grey iron, steel, or other suitable material, and the central mounting section 30 may comprise a metal alloy or other suitable material.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. A rotor assembly for a disc brake system, the rotor assembly comprising:
    a central mounting section including a hub adapted to be connected to a wheel or axle of a vehicle, a flange connected to a radial outer edge of the hub, and a first set of connection elements formed in or on the flange; and
    an outer friction ring section having friction surfaces adapted to make contact with one or more brake pads of a disc brake caliper, and including a radial inner flange and a second set of connection elements formed in or on the radial inner flange, the first set of connection elements of the central mounting section and the second set of connection elements of the outer friction ring section being configured to be press fit together to connect the central mounting section with the outer friction ring section;
    wherein the outer friction ring section includes a first ring member including a third set of connection elements disposed radially outwards of the radial inner flange of the outer friction ring section and the first and second sets of connection elements and a second ring member including a fourth set of connection elements disposed radially outwards of the radial inner flange of the outer friction ring section and the first and second sets of connection elements, wherein the third and fourth sets of connection elements are configured to be press fit together to connect the first ring member with the second ring member.

2. The rotor assembly of claim 1, wherein the first ring member is arranged substantially parallel with the second ring member.

3. The rotor assembly of claim 1, wherein the first set of connection elements of the central mounting section include one or more openings, and wherein the second set of connection elements of the outer friction ring section includes one or more protruding inserts on one or more of the first and second ring members.

4. The rotor assembly of claim 3, wherein, for connecting the outer friction ring section with the central mounting section, each of the one or more protruding inserts on the first ring member is press fit into a respective opening of the central mounting section from a first direction and each of the one or more protruding inserts on the second ring member is press fit into the respective opening of the central mounting section from a second direction opposite the first direction.

5. The rotor assembly of claim 3, wherein each of the first and second ring members includes between 3 and 12 protruding inserts and the central mounting section includes between 3 and 12 openings.

6. The rotor assembly of claim 1, wherein the third set of connection elements includes a plurality of projections and the fourth set of connection elements includes a plurality of stub receptacles, and wherein the projections are press fit into the stub receptacles to connect the first ring member with the second ring member.

7. The rotor assembly of claim 6, wherein the projections extend from an axially inward surface of the first ring member facing the second ring member and the stub receptacles extend from an axially inward surface of the second ring member facing the first ring member.

8. The rotor assembly of claim 7, wherein the length of the projections and stub receptacles define a separation distance between the axially inward surfaces of the first and second ring members to create a ventilation space between the first and second ring members.

9. The rotor assembly of claim 1, wherein the central mounting section is press fit with one of the first and second ring members in a first connection operation and the central mounting section and the one of the first and second ring members are press fit with the other of the first and second ring members in a second connection operation.

10. The rotor assembly of claim 1, wherein a material used to manufacture the outer friction ring section is different from a material used to manufacture the central mounting section.

11. The rotor assembly of claim 10, wherein the outer friction ring section comprises one of grey iron, steel and a ceramic material and the central mounting section comprises a metal alloy.

12. The rotor assembly of claim 1, wherein the flange of the central mounting section includes a non-circular outer edge and the radial inner flange of the outer friction ring section includes a non-circular inner edge corresponding to the non-circular outer edge of the flange of the central mounting section.

13. The rotor assembly of claim 1, wherein the third and fourth sets of connection elements are arranged in multiple rows extending radially outwards from the radial inner flange of the outer friction ring section.

14. The rotor assembly of claim 1, wherein the third and fourth sets of connection elements are arranged in multiple concentric rings extending radially outwards from the radial inner flange of the outer friction ring section.

15. A disc brake system of a vehicle, the disc brake system comprising:
    a caliper assembly having a pair of deployable brake pads; and
    a rotor assembly having friction surfaces adapted to engage the brake pads of the caliper assembly when deployed, the rotor assembly comprising:
    a central mounting section including a hub adapted to be connected to a wheel or axle of the vehicle, a flange connected to a radial outer edge of the hub, and a plurality of openings formed in the flange;
    a first ring member having a radial inner flange and a plurality of protruding inserts formed on the radial inner flange; and
    a second ring member arranged substantially parallel with the first ring member, the second ring member having a radial inner flange and a plurality of protruding inserts formed on the radial inner flange;
    wherein the protruding inserts of the first and second ring members are configured to be press fit into or disposed through the openings of the central mounting section to connect the central mounting section with the first and second ring members; and
    wherein the first and second ring members include a plurality of projections and a plurality of stub receptacles, respectively, disposed radially outwards of the radial inner flanges of the first and second ring members and the associated protruding inserts, and wherein the projections are configured to be press fit into the stub receptacles to connect the first ring member with the second ring member.

16. The disc brake system of claim 15, wherein, for connecting the first and second ring members with the central mounting section, the protruding inserts on the first ring member are press fit into the openings of the central mounting section from a first direction and the protruding inserts on the second ring member are press fit into the openings of the central mounting section from a second direction opposite of the first direction.

17. The disc brake system of claim 15, wherein the projections extend from an axially inward surface of the first ring member facing the second ring member and the stub receptacles extend from an axially inward surface of the second ring member facing the first ring member.

18. The disc brake system of claim 17, wherein the length of the projections and stub receptacles define a separation distance between the axially inward surfaces of the first and second ring members to create a ventilation space between the first and second ring members.

19. The disc brake system of claim 15, wherein the central mounting section is press fit with the second ring member in a first connection operation and the central mounting section and second ring member are press fit with the first ring member in a second connection operation.

20. The disc brake system of claim 15, wherein the plurality of projections and the plurality of stub receptacles are arranged in multiple rows extending radially outwards from the radial inner flanges of the first and second ring members.

21. The disc brake system of claim 15, wherein the plurality of projections and the plurality of stub receptacles are arranged in multiple concentric rings extending radially outwards from the radial inner flanges of the first and second ring members.

* * * * *